(12) United States Patent
Chen

(10) Patent No.: US 7,672,393 B2
(45) Date of Patent: Mar. 2, 2010

(54) SINGLE-WIRE ASYNCHRONOUS SERIAL INTERFACE

(75) Inventor: Isaac Y. Chen, Jhubei (TW)

(73) Assignee: Richtek Technology Corporation, Hsin-Chu (TW)

( * ) Notice: Subject to any disclaimer, the term of this patent is extended or adjusted under 35 U.S.C. 154(b) by 844 days.

(21) Appl. No.: 11/497,601

(22) Filed: Aug. 2, 2006

(65) Prior Publication Data

US 2008/0031167 A1 Feb. 7, 2008

(51) Int. Cl.
*H04L 25/49* (2006.01)

(52) U.S. Cl. .................. 375/286; 375/288; 375/293; 370/350

(58) Field of Classification Search ............ 375/242, 375/265, 286; 370/350
See application file for complete search history.

(56) References Cited

U.S. PATENT DOCUMENTS

| | | | | |
|---|---|---|---|---|
| 3,462,687 A * | 8/1969 | Lescinsky et al. | ............ | 375/236 |
| 4,065,662 A * | 12/1977 | Garczynski et al. | ......... | 235/419 |
| 4,244,051 A * | 1/1981 | Fujikura et al. | ............ | 375/286 |
| 4,255,813 A * | 3/1981 | Miyazaki | .................... | 375/254 |
| 4,282,601 A * | 8/1981 | Flora | ......................... | 375/293 |
| 4,355,397 A * | 10/1982 | Stuart | ........................ | 375/286 |
| 4,475,212 A * | 10/1984 | McLean et al. | ............ | 375/286 |
| 4,716,578 A * | 12/1987 | Wight | ........................ | 375/293 |
| 4,860,309 A * | 8/1989 | Costello | ..................... | 375/286 |
| 4,881,223 A * | 11/1989 | Debuysscher | ............... | 370/398 |
| 5,303,265 A * | 4/1994 | McLean | ..................... | 375/286 |
| 5,347,542 A * | 9/1994 | Kurby et al. | ................. | 375/286 |
| 5,384,769 A * | 1/1995 | Oprescu et al. | ............. | 370/276 |
| 5,504,751 A * | 4/1996 | Ledzius et al. | .............. | 341/144 |
| 5,644,600 A * | 7/1997 | Kawai | ........................ | 375/286 |
| 5,734,682 A * | 3/1998 | Lukac-Kuruc | ............... | 375/286 |
| 6,028,443 A * | 2/2000 | Ozaki | .......................... | 326/16 |
| 6,105,097 A * | 8/2000 | Larky et al. | .................. | 710/314 |
| 6,138,178 A * | 10/2000 | Watanabe | ....................... | 710/8 |
| 6,226,259 B1 * | 5/2001 | Piret | ........................... | 370/208 |
| 6,289,055 B1 * | 9/2001 | Knotz | ......................... | 375/286 |
| 6,298,395 B1 * | 10/2001 | Kurase | ........................ | 710/15 |
| 6,430,225 B1 * | 8/2002 | Okawa et al. | ................ | 375/242 |
| 6,445,748 B1 * | 9/2002 | Templin | ...................... | 375/287 |
| 6,501,441 B1 * | 12/2002 | Ludtke et al. | ................ | 345/1.1 |
| 6,530,887 B1 * | 3/2003 | Gilbert et al. | ............... | 600/459 |
| 6,570,930 B2 * | 5/2003 | Shepston | ..................... | 375/295 |
| 6,690,309 B1 * | 2/2004 | James et al. | ................. | 341/102 |
| 6,995,694 B1 * | 2/2006 | He et al. | ........................ | 341/58 |
| 7,013,178 B2 * | 3/2006 | Reinke et al. | ................. | 607/60 |
| 7,099,400 B2 * | 8/2006 | Yang et al. | ................... | 375/287 |
| 7,114,093 B2 * | 9/2006 | Tardieux et al. | ............. | 713/600 |
| 7,180,886 B2 * | 2/2007 | Liu et al. | ..................... | 370/350 |

(Continued)

*Primary Examiner*—Chieh M Fan
*Assistant Examiner*—Santiago Garcia
(74) *Attorney, Agent, or Firm*—Tung & Associates

(57) ABSTRACT

The present invention discloses a single-wire asynchronous serial interface, and a method for transmitting commands and data through one transmission wire, wherein the transmission wire is capable of transmitting signals of three level states. The disclosed interface comprises a signal level extraction circuit receiving signals transmitted through the wire and outputting logic or functional bits according to the received signals; a clock extraction circuit generating clock signals according to the functional bits, and a memory circuit controlled by the clock signals and storing the logic bits. The disclosed method comprises: using two of the level states to represent logic 0 and, logic 1, and the third of the states as a functional bit; and determining whether a group of signals is a command or data by the existence of a functional bit within the group.

10 Claims, 10 Drawing Sheets

U.S. PATENT DOCUMENTS

| | | |
|---|---|---|
| 7,197,650 B2 * | 3/2007 | Watanabe et al. ............ 713/300 |
| 7,206,368 B2 * | 4/2007 | Engel et al. .................. 375/371 |
| 7,228,366 B2 * | 6/2007 | Abramson et al. ............ 710/19 |
| 7,272,194 B1 * | 9/2007 | Mahmoud ................... 375/286 |
| 7,298,130 B2 * | 11/2007 | Komatsu et al. ......... 324/76.41 |
| 7,479,809 B2 * | 1/2009 | Illegems et al. ............... 327/77 |
| 2001/0032275 A1 * | 10/2001 | Watanabe et al. ............... 710/1 |
| 2002/0019952 A1 * | 2/2002 | Ueno ......................... 713/500 |
| 2002/0054390 A1 * | 5/2002 | Koizumi et al. ............. 358/513 |
| 2002/0137505 A1 * | 9/2002 | Eiche et al. ................. 455/425 |
| 2005/0147178 A1 | 7/2005 | Kikuchi |
| 2005/0166015 A1 * | 7/2005 | Bruner et al. ................ 711/112 |
| 2005/0237434 A1 * | 10/2005 | Takatori et al. .............. 348/725 |
| 2007/0092026 A1 * | 4/2007 | Tanimoto ..................... 375/286 |
| 2007/0167086 A1 * | 7/2007 | Tolli .......................... 439/712 |
| 2007/0286296 A1 * | 12/2007 | Chesne et al. ............... 375/259 |
| 2008/0025237 A1 * | 1/2008 | Yamada ...................... 370/301 |
| 2008/0031167 A1 * | 2/2008 | Chen .......................... 370/298 |
| 2008/0056405 A1 * | 3/2008 | Sada et al. .................. 375/286 |
| 2008/0080652 A1 * | 4/2008 | Wang et al. ................. 375/359 |
| 2009/0243815 A1 * | 10/2009 | Tolli ..................... 340/310.11 |

* cited by examiner

SINGLE-WIRE ASYNCHRONOUS SERIAL INTERFACE

BACKGROUND OF THE INVENTION

1. Field of the Invention

The present invention relates to a single-wire asynchronous serial interface, in particular to a single-wire asynchronous serial interface which is capable of transmitting commands, data, and even power, and it is not required for the transmission side and the receiving side to synchronize their clocks.

2. Description of the Related Art

FIG. 1 shows a conventional arrangement for single-wire serial transmission between a transmitting side Tx and a receiving side Rx. The signals transmitted by the transmitting side Tx should include a start bit, a command of fixed bit length, data of fixed bit length, and a stop bit. The function of the start bit is for synchronization between the transmitting side Tx and the receiving side Rx; as shown by the arrow, when the receiving side Rx receives this start bit, it begins to generate clock signals in synchronization with the rising edge of the start bit. The receiving side Rx receives and counts the bit lengths of the command and the data according to the synchronous clock signals. The bit lengths of the command and the data should follow a protocol previously agreed between the transmitting side Tx and the receiving side Rx. Such a conventional arrangement is called "synchronous transmission" because the transmission side Tx and the receiving side Rx have to synchronize their clocks, and the transmitting side Tx has to transmit data according to the clock frequency of the receiving side Rx.

The above-mentioned conventional arrangement has the following drawbacks. First, the transmitting side Tx has to know the clock frequency of the receiving side Rx in advance. Second, to ensure correct receipt of command and data signals, the transmitting side Tx needs to properly arrange the set-up time and hold time of the transmitted signals. Furthermore, since the bit lengths of the command and data are fixed, there are only limited number of commands that can be transmitted. For example, if the bit length of a command signal is 5 bits, it can only transmit $2^5=32$ types of commands.

FIG. 2 shows a conventional arrangement for single-wire tri-state data transmission, in which the transmitted data have three level states: 0, 1, or T (third-state). However, conventionally, such an arrangement is still for data transmission, except that there are three level states instead of two. No other use has been proposed.

In view of the foregoing drawbacks, the present invention proposes a single-wire asynchronous serial interface which is capable of transmitting commands, data, and even power, and it is not required for the transmission side and the receiving side to synchronize their clocks.

SUMMARY OF THE INVENTION

A first objective of the present invention is to provide a single-wire asynchronous serial interface which is capable of transmitting commands, data, and even power, and it is not required for the transmission side and the receiving side to synchronize their clocks.

A second objective of the present invention is to provide a method for transmitting signals through a single transmission wire.

To achieve the foregoing objectives, the present invention proposes a single-wire asynchronous serial interface, wherein said single-wire is capable of transmitting signals of three level states, the interface comprising: a signal level extraction circuit receiving signals transmitted through the single-wire and outputting logic or functional bits according to the received signals; a clock extraction circuit generating clock signals according to the functional bits; and a memory circuit controlled by the clock signals and storing the logic bits.

The single-wire asynchronous serial interface may be used to transmit power.

In addition, the present invention also proposes a method for transmitting commands and data through a wire, wherein the wire is capable of transmitting signals of three level states, the method comprising: using two of the level states to represent logic 0 and logic 1, respectively, and the third of the states as a functional bit; and determining whether a group of signals is a command or data by the existence of a functional bit within the group.

The method may further comprise: transmitting power through the wire.

For better understanding the objectives, characteristics, and effects of the present invention, the present invention will be described below in detail by illustrative embodiments with reference to the attached drawings.

DESCRIPTION OF THE PREFERRED EMBODIMENT

Figure 1:
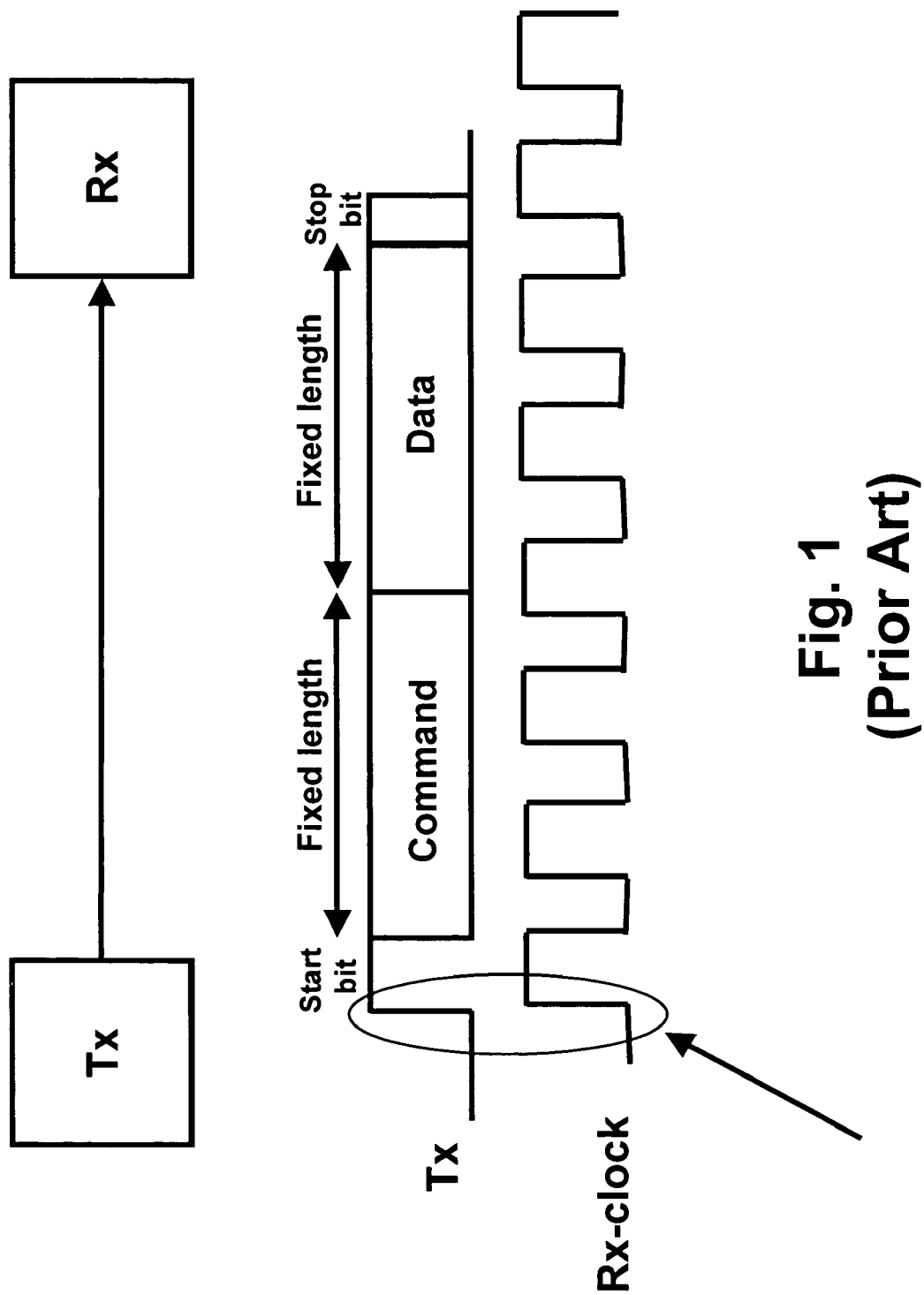
FIG. 1 shows a conventional arrangement for single-wire serial transmission.
Figure 2:
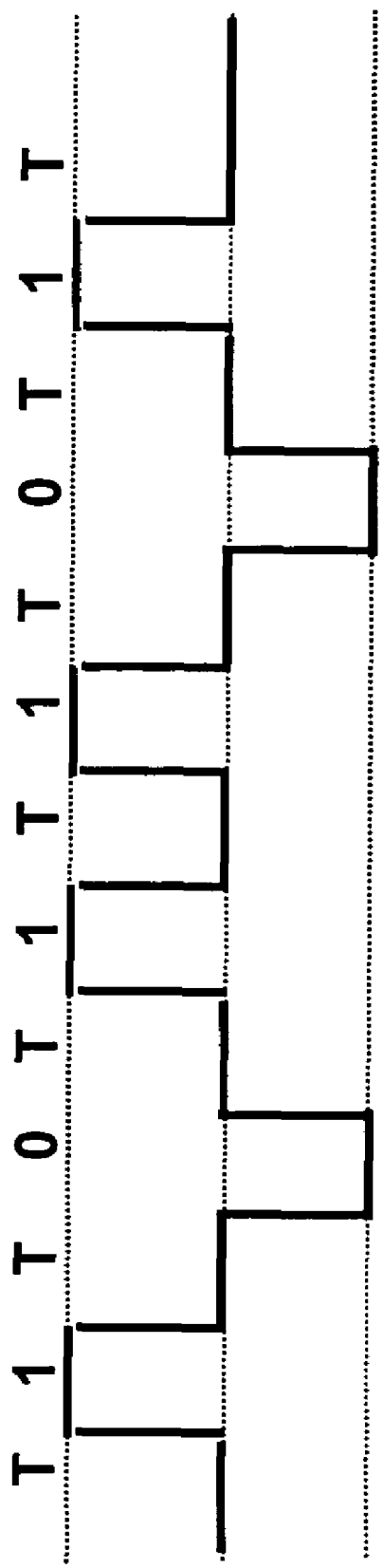
FIG. 2 shows a conventional arrangement for single-wire tri-state data transmission.

In the conventional tri-state data transmission shown in FIG. 2, the three level states of signals are used for three data states: high level for 1, middle level for T, and low level for 0. However, according to the present invention, it is not necessary to use all three levels for data; one of the three states may be used to define commands.

Figure 3A:
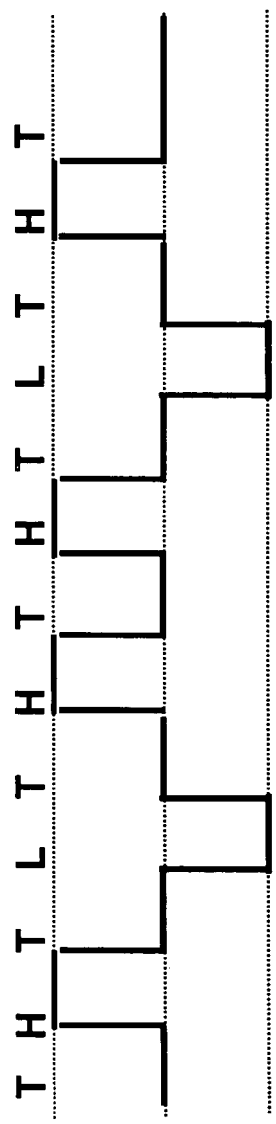
FIGS. 3A-3C show three possible arrangements according to the present invention to define data signals.
Figure 3B:
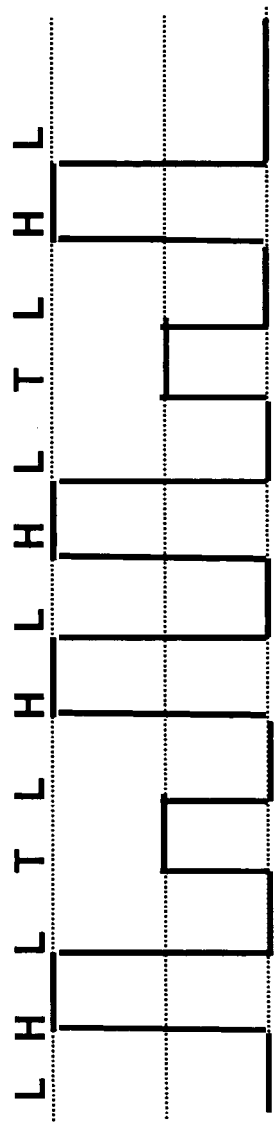
Figure 3C:
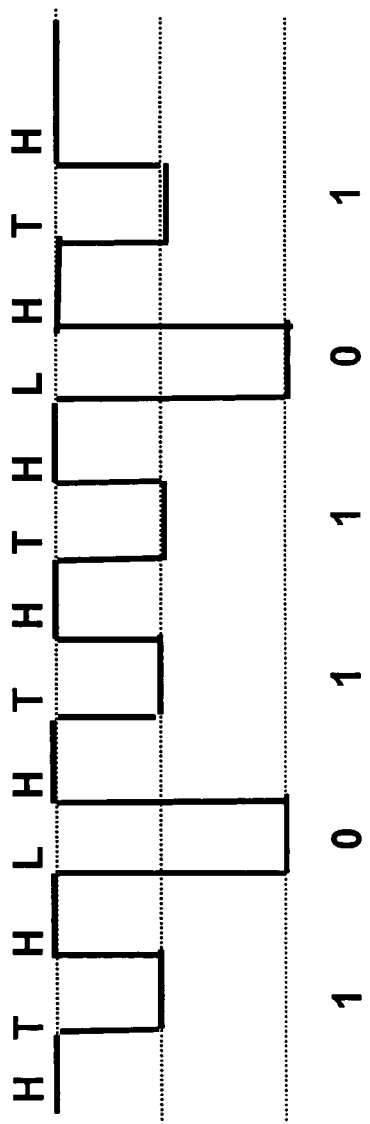

Referring to FIGS. 3A-3C, in which H stands for high level, T stands for middle level, and L stands for low level, according to the present invention, it may be defined so that H is logic 1, T is functional bit C, and L is logic 0 (FIG. 3A). Or, it may be defined so that H is logic 1, T is logic 0, and L is functional bit C (FIG. 3B). Or, it may be defined so that H is functional bit C, T is logic 1, and L is logic 0 (FIG. 3C). Or, it may even be defined so that H/T/L=0/C/1, C/0/1, or 0/1/C, etc. The signals shown in FIGS. 3A-3C equally represent data 101101 (H/L in FIG. 3A, H/T in FIG. 3B, and T/L in FIG. 3C).

Figure 4A:
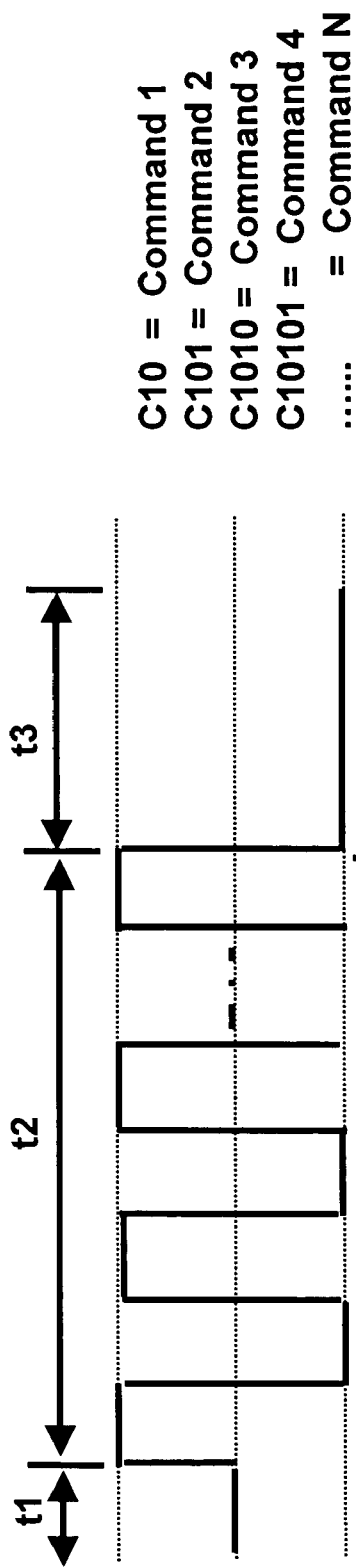
FIGS. 4A and 4B, and FIGS. 5A and 5B, show possible arrangements according to the present invention to define command signals.

Assuming the arrangement shown in FIG. 3A is used; according to the present invention, the functional bit C (also referred to as the C signal in this invention) may be used to indicate the start of a command, and the content of the command (i.e., the code number of the command) may be expressed by alternating high/low level signals (or low/high level signals). FIG. 4A shows an example to express commands. In the time period t1, the receiving side receives a middle level C signal, indicating that a command is about to be sent. Next, in the time period t2, the receiving side Rx receives N positive pulses. Further next, in the time period t3, the receiving side Rx does not receive any positive pulse within a predetermined time period (which may be a fixed time period, or a multiple of the period of a pulse). Thus, the receiving side Rx determines that the received command is the command N, and carries out a corresponding action. (Alternatively, it is also possible to use the first positive pulse, instead of a middle level C signal, as a start signal. In this case, when N positive pulses are received, it means the command N−1.)

A command may be carried out after it has been confirmed by the time-out mechanism as described above, or, if greater efficiency is desired, the coding order of the commands may be arranged so that a command having a smaller code number does not conflict with a command having a larger code number. In the latter case, the circuit at the receiving side may start a corresponding action in response to receiving the first positive pulse, to speed up processing time. For example, a "read" command may be given a smaller code number (such as the command 1) while a "write" command may be given a larger code number (such as the command 2). The receiving side starts the read action in response to receiving the first positive pulse, and when it receives the second positive pulse, it aborts the read action but switches to the write action. Since a write action changes the content of the memory, but a read action does not, the read action should be given a code number preceding the write action. If such an arrangement is used, the receiving side may instantly starts an action corresponding to the received command, i.e., immediately after the end of the Nth pulse, to speed up process time.

Figure 4B:
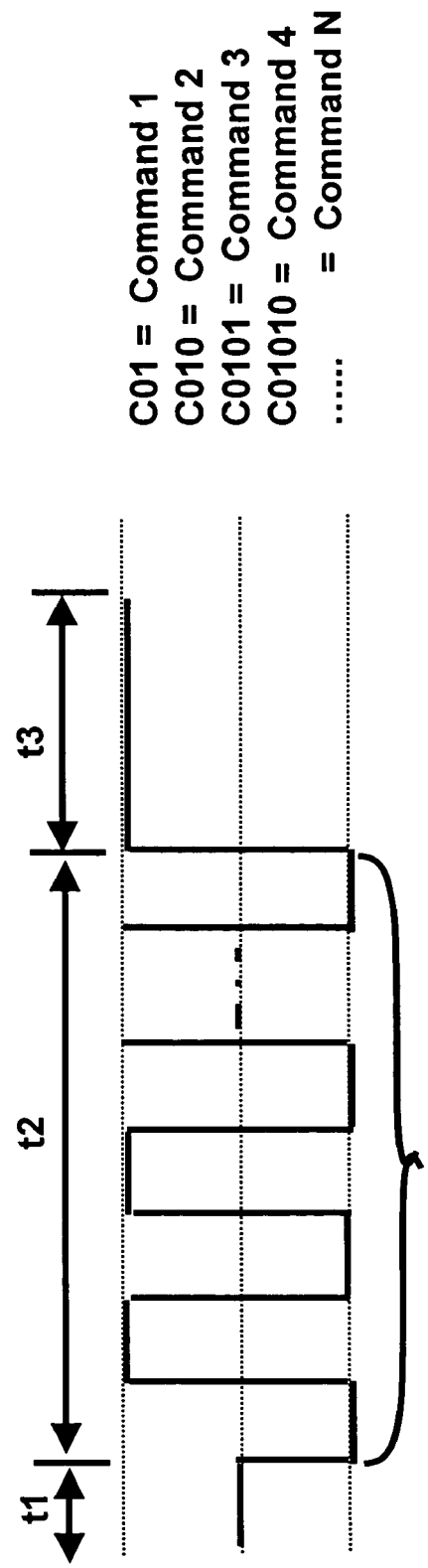

FIG. 4B shows that it is also possible to achieve the same purpose by counting the negative pulses; that is, a signal group with N negative pulses represents the command N. And of course, as may be readily conceived by one skilled in this art, it is also possible to use high/low level switching and low/high level switching to represent different command sets; the receiving side may detect whether it is a rising edge or a downward edge following the starting C signal, to determine whether the receiving side should count the positive or the negative pulses. This may further save time for command transmission. The receiving side may decode the command by proper means.

Figure 5A:
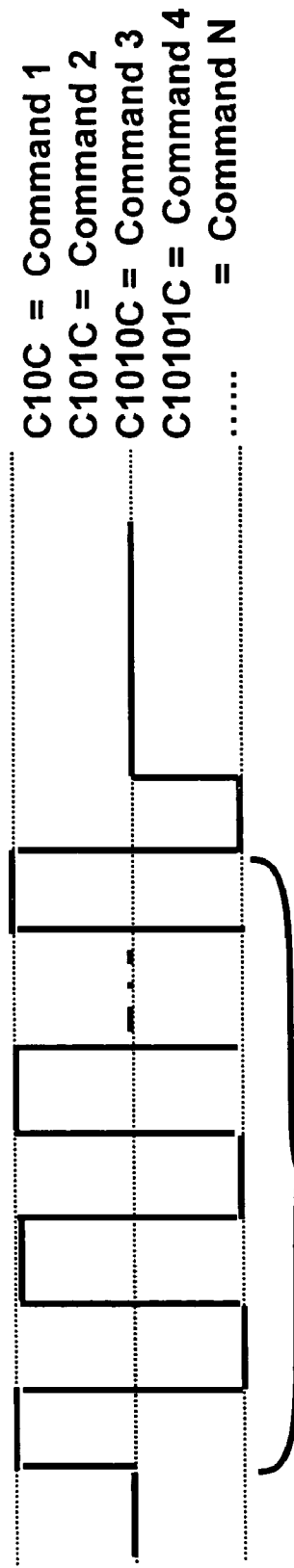
Figure 5B:
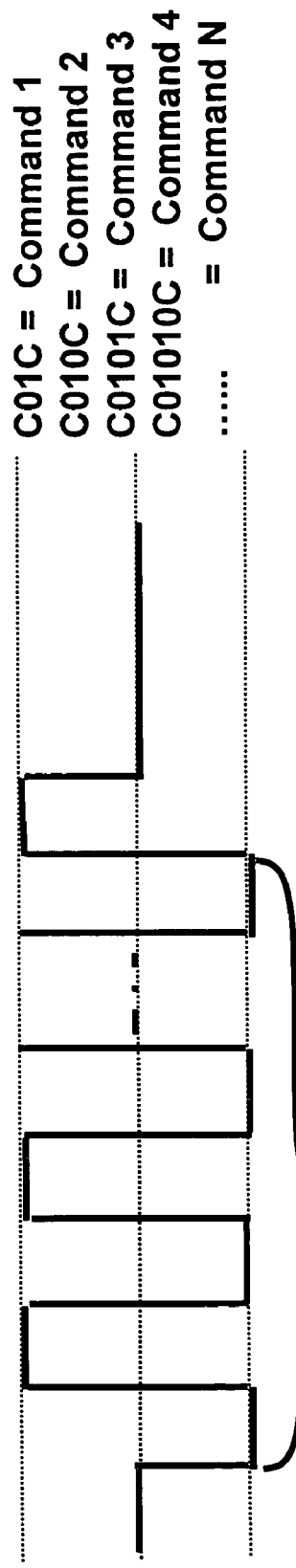

To confirm a command, besides the time-out mechanism as described above, there are other alternatives as shown in FIGS. 5A and 5B. After the transmission of a command ends, the transmitting side transmits a C signal to notify the receiving side that "the transmission of the command is completed". (But the C signal should preferably be sent after a complete high/low or low/high cycle, so that the command is not mistaken as data signals.) In this manner, the receiving side also knows what the received command is. Similar to FIGS. 4A and 4B, the arrangement in FIG. 5A counts the positive pulses, while the arrangement in FIG. 5B counts the negative pulses. As described above, the two arrangements may be combined together to further reduce the average time required for receiving a command.

One important advantage of the above-mentioned embodiments is that the transmitting side does not need to know the clock frequency of the receiving side in advance; to send signals, the transmitting side does not need to worry about the signal set-up time and hold time, so the transmission is much simpler than that in the prior art. In addition, the number of commands that can be transmitted is unlimited.

Turning back to FIG. 3A, because the transmitting side and the receiving side are not synchronized, it is necessary to let the receiving side know when the transmitted data starts and ends. The start of the data may be decided by detecting whether there is a rising edge or a downward edge departing from a C signal (middle level). The end of the data may be decided by, e.g., time-out, a C signal as a stop bit, or assigning fixed bit length to the data. The data arranged in the ways shown in FIGS. 3B and 3C may be similarly identified, and the details thereof are omitted.

How does the receiving side distinguish command signals from data signals? Referring to FIGS. 3A, 4A and 5A, it can be seen that the format for data (FIG. 3A) and the format for a command (FIGS. 4A and 4B) are different. The format for data is [1/0, C, 1/0, C, ..., C, 1/0, C (if C is used as the stop bit)], while the format for a command is [1, 0, 1, 0, ..., 1, 0, (0 or C)]. Therefore, the receiving side may distinguish command signals from data signals by proper decoding means.

The format for data and the format for a command are interchangeable, but the foregoing arrangement is preferred because the bit length of data is normally longer than that of a command.

Figure 6:
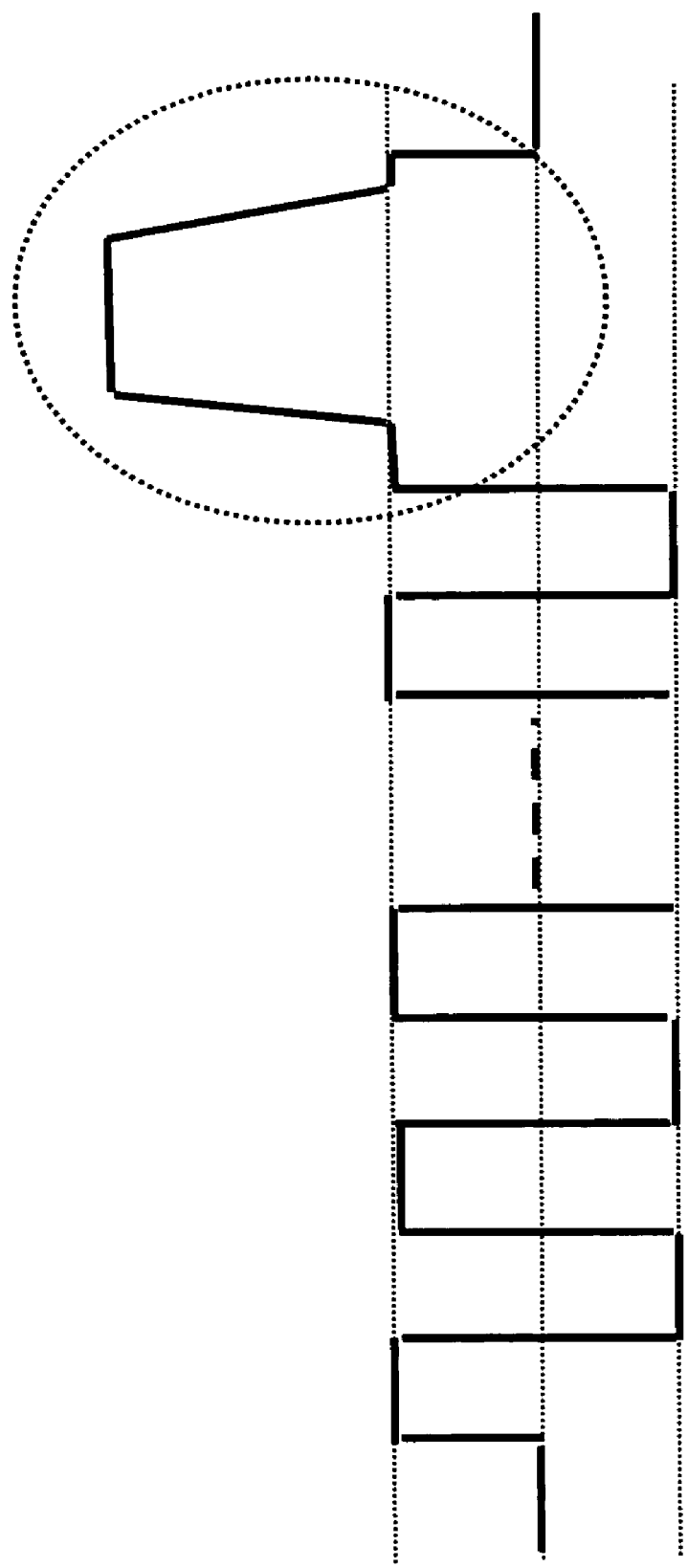
FIG. 6 shows that it is also possible to transmit power through the transmission wire according to the present invention.

According to the present invention, in addition to transmitting commands and data through the single transmission wire, the same wire may also be used to supply power. Referring to the example shown in FIG. 6, the transmitting side may first send a command which stands for "I am about to supply power to you", and after the receiving side is ready, begins to supply power (which is much higher than the high level for digital signals) to the receiving side. In other words, the transmission wire is not limited to transmitting digital signals, but can also supply analogue voltage power.

Figure 7:
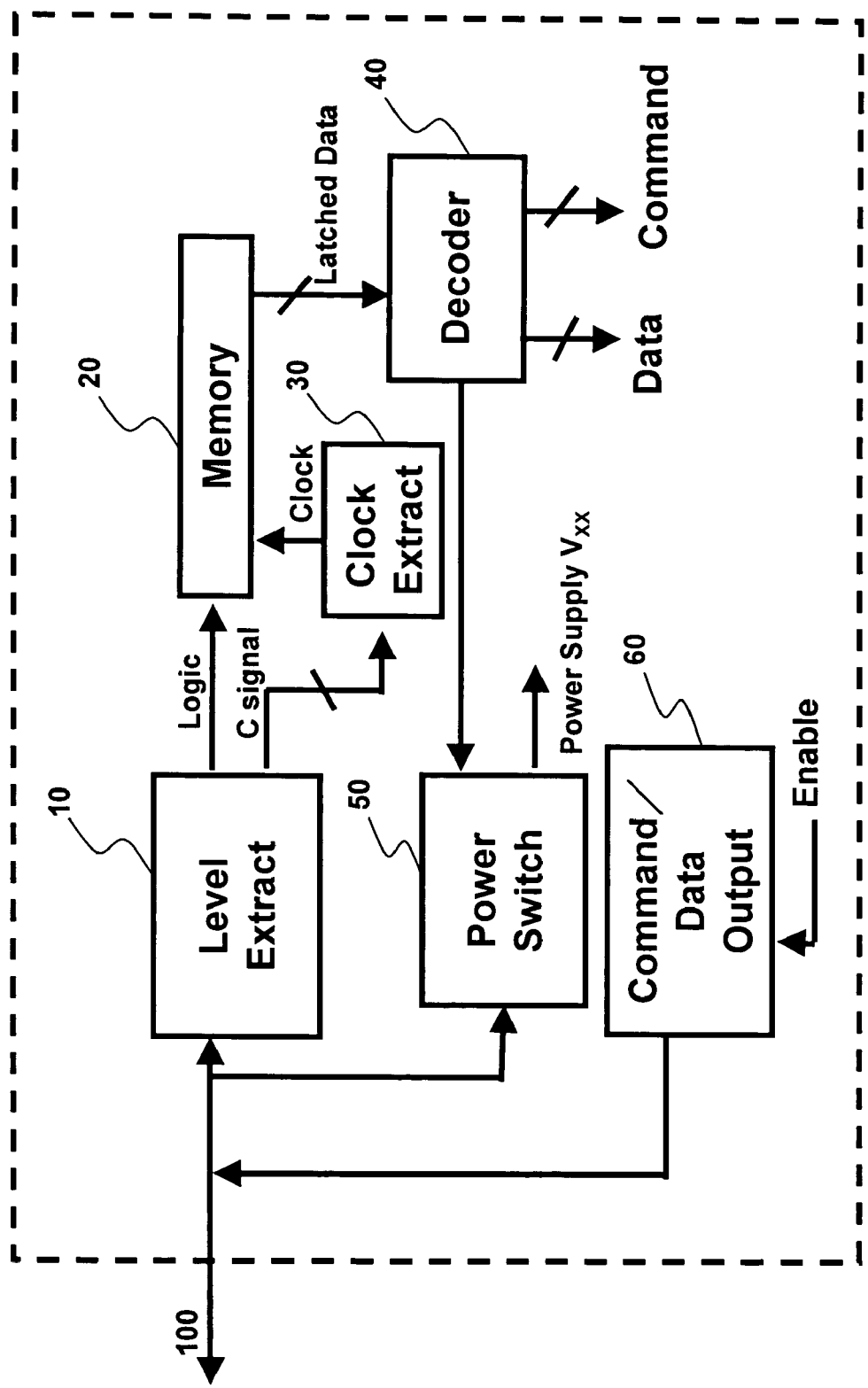
FIG. 7 schematically shows a preferred circuit embodiment according to the present invention.

Referring to FIG. 7 which schematically shows a preferred embodiment according to the present invention, a hardware circuit structure of a single-wire asynchronous serial interface is disclosed. The circuit may be integrated in the circuit of the receiving side, or may be a stand-alone integrated circuit. As shown in the figure, the signals transmitted from the transmitting side Tx through the wire 100 are first received by a level extraction circuit 10, which extracts the level of the signals to identify whether the level is H (high level), T (middle level), or L (low level). The extracted result is sent to a memory 20. The memory 20 in this embodiment is a serial-in-parallel-out (SIPO) memory, which for example may be a shift register. The extracted result is sent to a clock extraction circuit 30, which generates clock signals according to the trigger edge of the received signals, and supplies the clock signals to the SIPO memory 20. The details as to how the clock signals are generated will be further explained hereinafter.

The content of the SIPO memory 20 is sent in parallel to a decoder circuit 40. If the content is a command (i.e., the code number of a command—the command 1-N), the decoder circuit 40 outputs the corresponding content of the command (i.e., the action required to execute the command, e.g., a read action). If the content of the SIPO memory 20 is data, the decoder circuit 40 outputs the data. As shown in the figure, the decoded command and the data may be transmitted to suitable next-stage circuits by different buses respectively; alternatively, depending on the circuit design of the receiving side, the decoded command and the data may be transmitted by a common bus.

If the content of the SIPO memory 20 indicates that "power is about to be supplied", the decoder circuit 40 outputs a control signal to turn ON a power switch 50. Thereafter, the power from the transmitting side through the wire 100 may be supplied to the receiving side through the power switch 50.

The foregoing circuit parts have constituted an interface for receiving commands, data and power. The circuit may be further provided with a command/data output circuit to transmit a command or data outward, so that the interface becomes a bi-directional interface. The bi-directional interface may for example be controlled by an enable signal, to decide whether the interface should work in a transmitting mode or a receiving mode.

Figure 8:
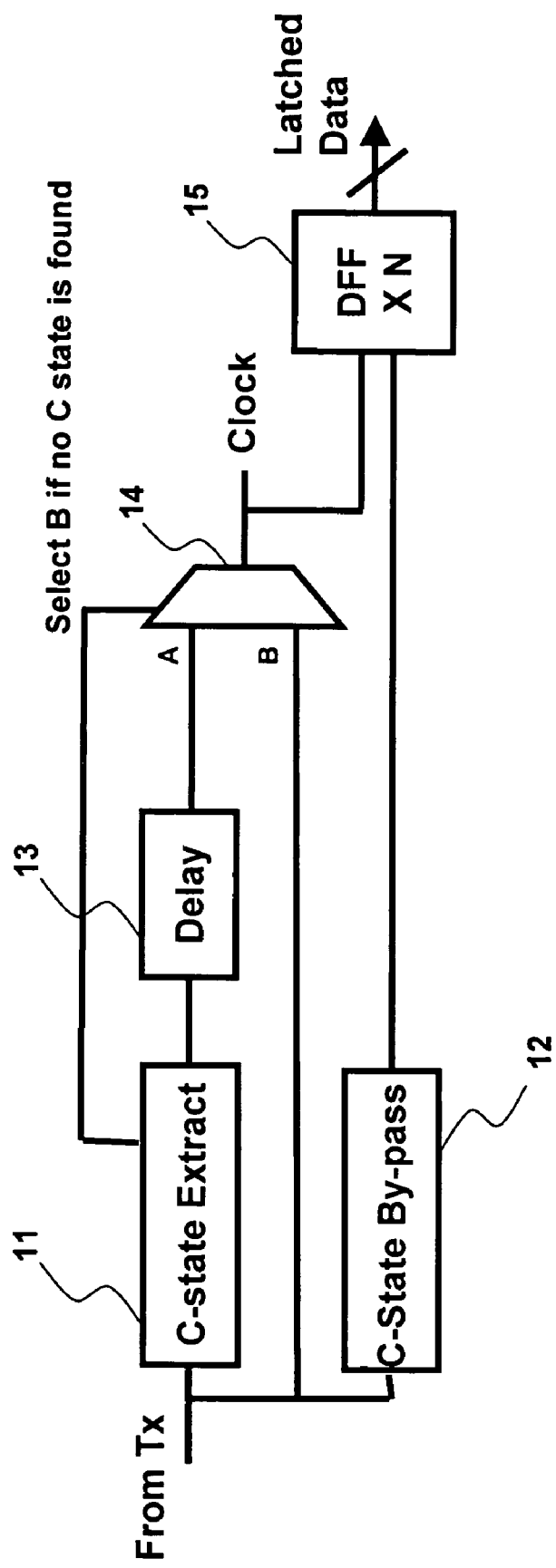
FIG. 8 schematically shows how to extract data, commands and clock signals.
Figure 9:
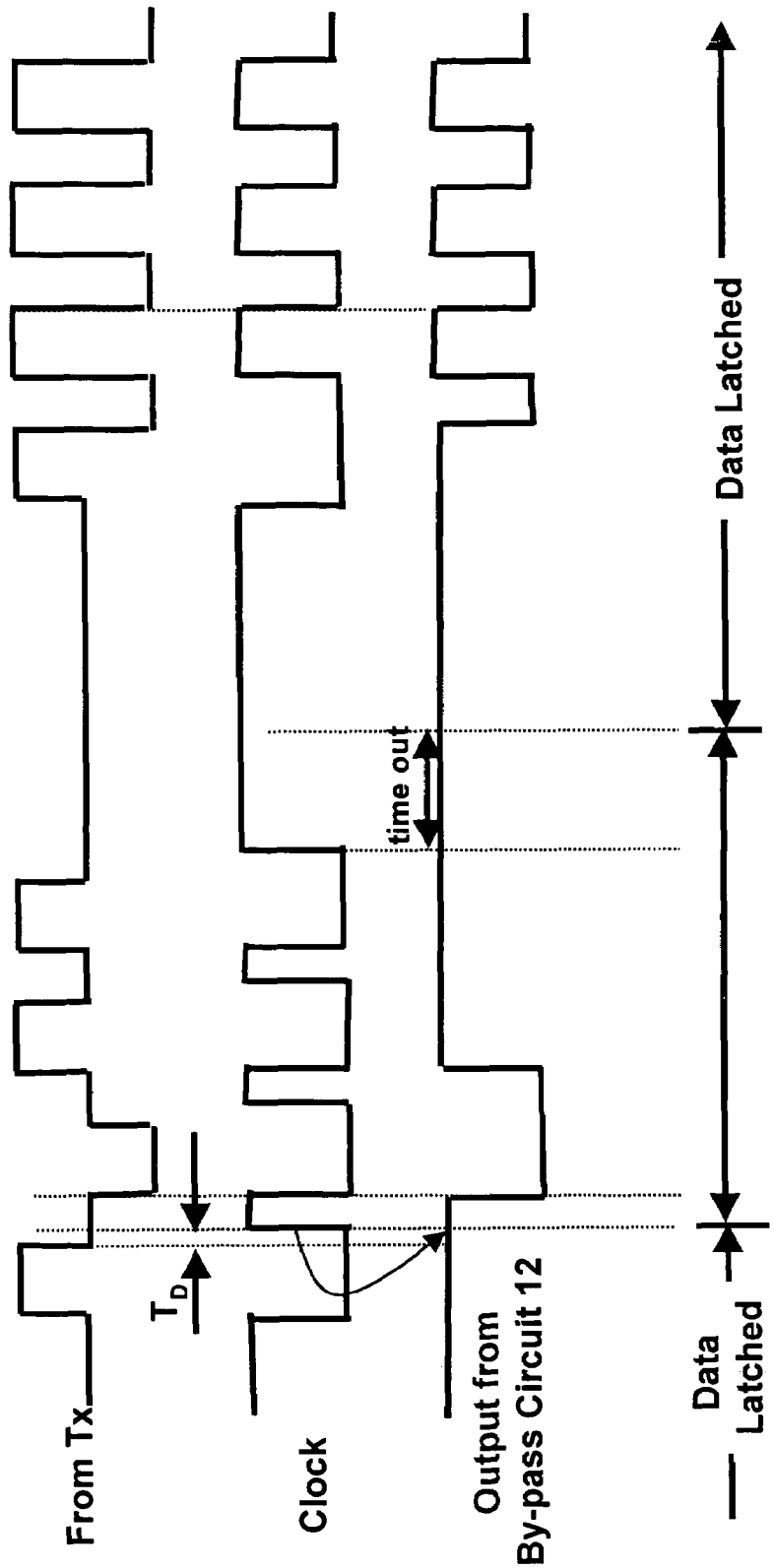
FIG. 9 is a signal time chart of the nodes in the circuit shown in FIG. 8.
Figure 10:
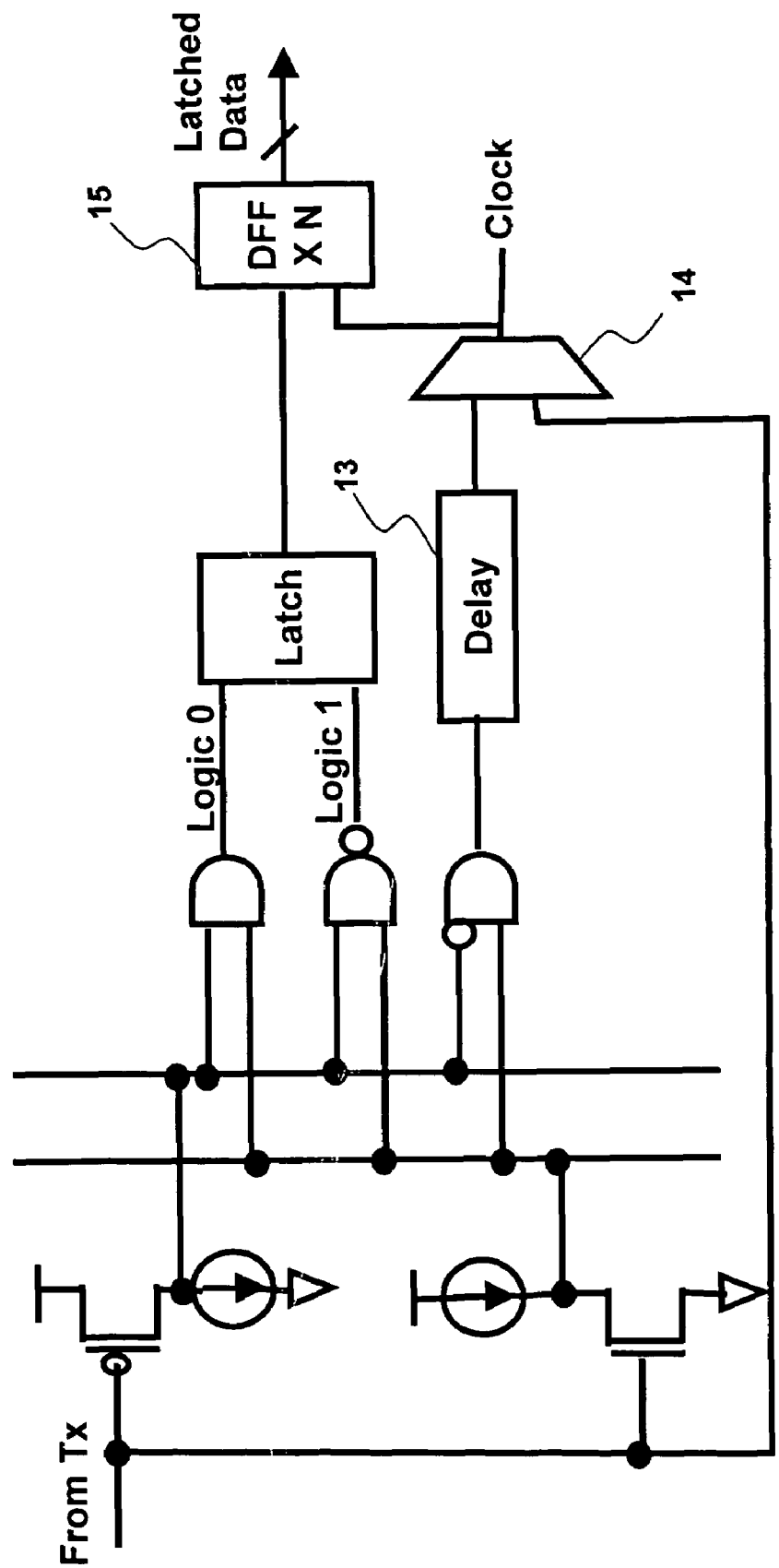
FIG. 10 is a preferred embodiment of the circuit schematically shown in FIG. 8.

Referring to FIGS. 8-10, it will be explained as to how the level extraction circuit 10, the SIPO memory 20 and the clock extraction circuit 30 operate to extract data and command signals, and generate clock signals.

First Referring to FIG. 8, the signals transmitted from the transmitting side Tx through the wire first pass through a C-state extraction circuit 11 to extract C signals therefrom (assuming that the arrangement shown in FIG. 3A is used, in which the C signals are the middle level signals). The output of the C-state extraction circuit 11 passes through a delay circuit 13, and the output of the delay circuit 13 is sent to the input terminal A of a selection gate 14. The other input terminal B of the selection gate 14 directly receives the signals transmitted from the transmitting side Tx through the wire. If, within a predetermined time period, the selection gate 14 does not receive any C signal, it selects to output signals from its input terminal B; otherwise, the selection gate 14 output signals from its input terminal A. The output of the selection gate 14 is the clock signals (Clock), which is sent to a D flip-flop 15 to control its clock. Besides the above, the signals transmitted from the transmitting side Tx through the wire are also sent to a C-state by-pass circuit 12 to filter out the C-signals. The output from the C-state by-pass circuit 12 is sent to the D flip-flop 15 as its data input. Since the memory 20 is a SIPO memory, there are actually multiple D flip-flops 15 to transfer the serial input to parallel output. However, for simplicity of the drawing, only one D flip-flop 15 is shown, but marked with (x N). If the memory 20 is a serial-in-serial-out memory, then only one flip-flop is required.

Now please refer to the time chart of FIG. 9, which shows the signal waveforms of the nodes in the circuit shown in FIG. 8. The signals transmitted from the transmitting side Tx through the wire are the first waveform, which represents (from the left side of the waveform) data 1011, stop, a start bit of a command, and 101010.

The second waveform is the waveform of the clock signals (Clock). As shown in the left side of the figure, when C-signals are detectable, the selection gate 14 generates the clock signals (Clock) in correspondence with the C signals. Due to the delay circuit 13, the generation of each clock signal (Clock) is delayed for a time $T_D$ as compared with the rising edge of each C signal, but the clock signal (Clock) returns to the OFF state immediately at the end of each C-signal.

If, within a predetermined time period, no C signal is received, the selection gate 14 selects to directly output the signals transmitted from the wire. As shown in the right side of the figure, the clock signals (Clock) follow the signals transmitted from the wire.

By comparison between the first and second waveforms, it may be seen that the present invention, in addition to what have been described, includes an additional advantage that there is no concern for signal set-up time or hold time. In the present invention, the format of data signals is [C, 1/0, C], while the clock signal to receive the data is not ON until the start of the second C signal (in the preferred embodiment, there is a delay of $T_D$, so it is even safer), so the signal set-up time is at least a complete clock of the transmitting side. The clock signal returns to OFF state at the end of the C signal, so the signal hold time is a complete clock of the receiving side.

The third waveform shown in the figure is the output from the C-state by-pass circuit 12. As seen from the figure, its output is data 1011, and command 101010.

When there is a C signal longer than a predetermined time period, i.e., when time-out is detected, the data is latched, as shown in the right hand side of the figure.

The circuit schematically shown in FIG. 8 may be embodied, for example, as shown in FIG. 10. The operation of the circuit parts in the figure may be readily understood by one skilled in this art, and therefore the detailed explanation thereof is omitted.

The features, characteristics and effects of the present invention have been described with reference to its preferred embodiments, which are illustrative of the invention rather than limiting of the invention. Various other substitutions and modifications will occur to those skilled in the art, without departing from the spirit of the present invention. For example, the serial-in-parallel-out memory 20 may be replaced by a serial-in-serial-out memory, with corresponding modifications to other circuit parts that cooperate with the memory 20. Therefore, all such substitutions and modifications are intended to be embraced within the scope of the invention as defined in the appended claims.

What is claimed is:

1. A single-wire asynchronous serial interface, wherein said single-wire is transmitting signals of three level states, said interface comprising:
   a signal level extraction circuit receiving signals transmitted through said single-wire and outputting logic or functional bits according to said received signals, wherein two of the level states represent logic 0 and logic 1, respectively, and the third of the level states is used as a functional bit;
   a clock extraction circuit generating clock signals according to said functional bits; and
   a memory circuit controlled by said clock signals and storing said logic bits.

2. The single-wire asynchronous serial interface of claim 1, wherein said clock extraction circuit generates clock signals in synchronization with said functional bits when said functional bits repetitively appear between adjacent two said logic bits; and generates clock signals according to said logic bits after a period of time during which said clock extraction circuit does not receive any said functional bits.

3. The single-wire asynchronous serial interface of claim 1, wherein said clock extraction circuit includes a delay circuit so that said clock signals are delayed.

4. The single-wire asynchronous serial interface of claim 1, wherein said memory circuit is a serial-in-parallel-out memory.

5. The single-wire asynchronous serial interface of claim 4, wherein said serial-in-parallel-out memory is a shift register.

6. The single-wire asynchronous serial interface of claim 1, further comprising a decoder circuit which decodes the output from said memory circuit to generate a command or data.

7. The single-wire asynchronous serial interface of claim 1, which selectively transmits signals and power according to what is received from said single-wire, whereby said same single-wire is capable of transmitting signals and power at different timings.

8. The single-wire asynchronous serial interface of claim 7, further comprising a power switch circuit for receiving power transmitted through said single-wire.

9. The single-wire asynchronous serial interface of claim 8, wherein said power switch circuit is controlled by an output from a decoder circuit.

10. The single-wire asynchronous serial interface of claim 1, further comprising a command/data output circuit for transmitting a command or data outward through said single-wire.

* * * * *